United States Patent
Porcino

(10) Patent No.: US 7,424,052 B2
(45) Date of Patent: Sep. 9, 2008

(54) METHOD OF, AND RECEIVER FOR, ESTIMATING THE BIT RATE OF DATA

(76) Inventor: Domenico G. Porcino, 75, Thornton Place, Horley, Surrey (GB) RH6 8RH ( * ) Notice: Subject to any disclaimer, the term of this patent is extended or adjusted under 35 U.S.C. 154(b) by 389 days.

(21) Appl. No.: 11/103,897

(22) Filed: Apr. 12, 2005

(65) Prior Publication Data
US 2005/0213651 A1   Sep. 29, 2005

Related U.S. Application Data

(63) Continuation of application No. 09/862,281, filed on May 22, 2001, now Pat. No. 6,898,237.

(30) Foreign Application Priority Data
May 31, 2000   (GB) .................. 0013147.4

(51) Int. Cl.
*H04B 17/00*   (2006.01)
(52) U.S. Cl. .................................... 375/225
(58) Field of Classification Search ................. 375/224, 375/225, 316
See application file for complete search history.

(56) References Cited

U.S. PATENT DOCUMENTS 5,724,389 A * 3/1998 Marko et al. ................ 375/225

* cited by examiner

*Primary Examiner*—Don N Vo

(57) ABSTRACT

A bit rate detector for detecting the speed of transmission of a data signal having one of at least two alternative bit rates, comprises a differential decoder (28) for differentially decoding received digitally modulated signals into oversampled complex signals, a summing stage (38, 40 and 42) for forming a running sum of successive groups of samples, and a bit rate detector (58). The bit rate detector (58) having a stage (62, 66 (FIG. 5)) for determining if the running sum represents a signal as opposed to interference, and if the running sum represents a signal, determining the sign of the running sum, a stage (74 (FIG. 5)) for assigning one of two binary values dependent on whether the sign is positive or negative, a shift register (82 (FIG. 5)) for storing successive binary values, a comparator (88 (FIG. 5)) for comparing the content of the shift register with a threshold value related to one of the at least two alternative bit rates, and if the threshold value is exceeded concluding that the data signal is at said one bit rate, but if not repeating the method with the threshold value being related to the other or another of the bit rates.

2 Claims, 3 Drawing Sheets

METHOD OF, AND RECEIVER FOR, ESTIMATING THE BIT RATE OF DATA

Figure 1:
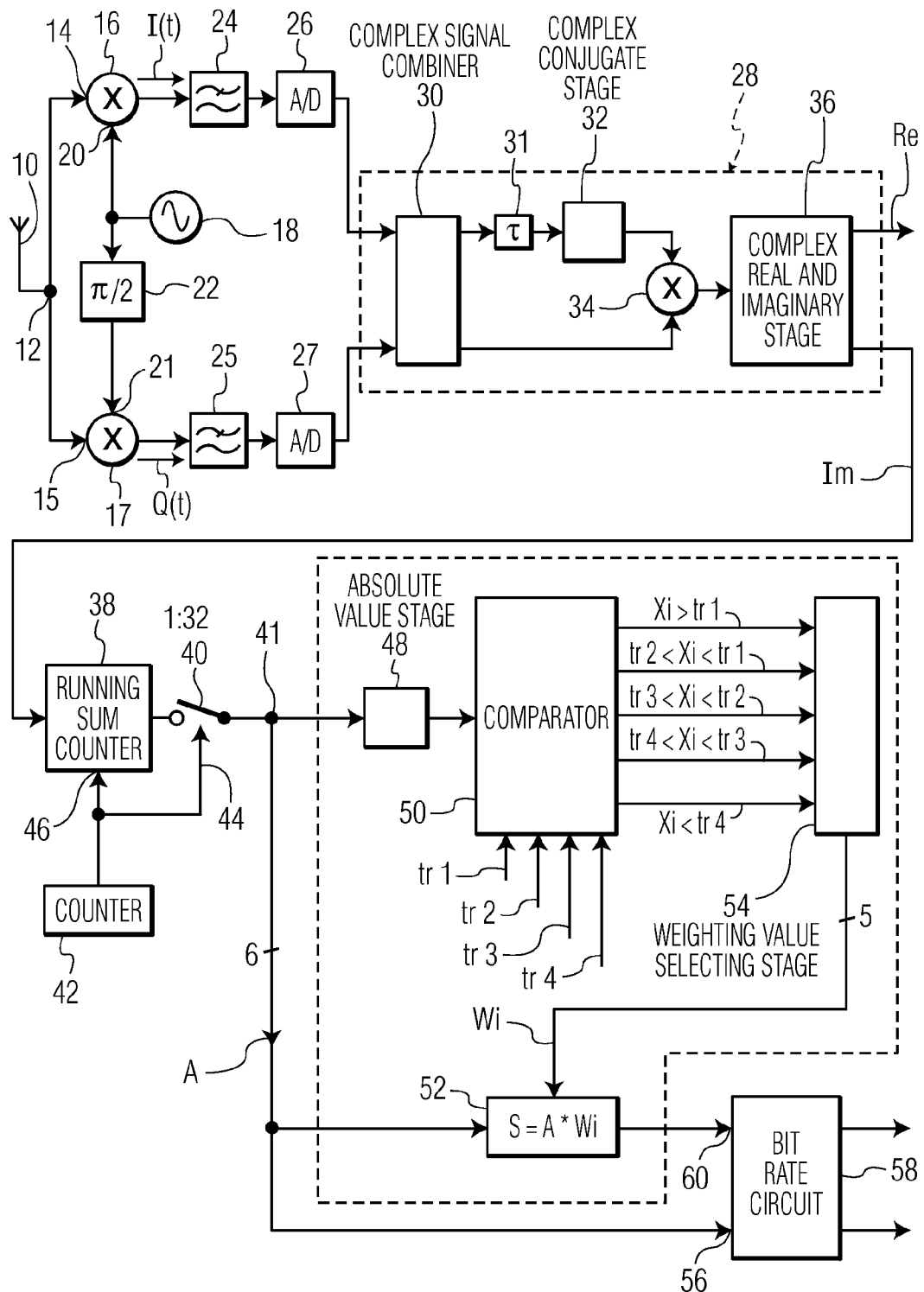

This is a Continuation of application Ser. No. 09/862,281, filed May 22, 2001 now U.S. Pat. No. 6,898,237.

The present invention relates to a method of, and receiver for, estimating the bit rate of a received data signal. Such a receiver is typically a receiver section of a telemetry module used for applications such as automatic water metering.

Telemetry modules are installed in equipment which may be continuously in use for many years without being serviced. In the case of battery powered telemetry modules it is desirable for them to operate for up to 10 years between battery replacements. To be able to achieve such long service lives the telemetry modules operate in accordance with a protocol facilitating current saving whilst giving an adequate response time. Protocols achieving these objectives are well known in various technical fields such as digital paging in which the CCIR Radiopaging Code No. 1, alternatively known as POCSAG, has been in use for nearly 20 years. The general approach followed is that the radio unit "sleeps" for long periods of time but wakes up periodically to check if there are any data signals being transmitted on its channel. The wake-up period may be preset independently of whether or not signals are present. In a refinement of this type of battery economy protocol, when the radio unit has been woken-up, it checks for the presence of data before energising the entire receiver and if none is detected within a period of time which is shorter than the preset period, it powers down prematurely.

In a more refined system, the protocol can include transmissions with different bit-rates to different receiving units. Each of these units can therefore save further battery power if, once having detected the presence of an over-the-air signal, it is also able to determine rapidly if this particular transmission is or is not intended for itself, for example by checking if the signal is or is not at the bit rate it is expecting. This can be done by providing a bit rate detector which will provide a fast and accurate estimate of the bit rate of the message whilst avoiding having to wake-up the decoding part of the receiver which is the most power consuming. An alternative, slower approach is, in fact, to wake-up the full receiver, decode the address part of the message and compare it with the known address of the unit.

U.S. Pat. No. 5,790,946 discloses a communications device comprising a two part receiver, a first of the two parts is a wake-up receiver and the second of the two parts is a master receiver which is activated in response to the wake-up receiver detecting the correct rf frequency first and the correct data rate second.

WO99/25051 discloses a system having particular application to telemetry systems in which a central station transmits a wake-up call as a sequence comprising several portions, each portion being preceded by a unique sync code word indicating the position of the portion in the sequence. If a receiver is unable to detect one of the portions, it powers down for the remainder of the wake-up period and the next following sleep period.

In spite of these known methods there is still a desire to speed-up the estimation of the correct bit rate so that the battery saving can be enhanced.

An object of the present invention is to estimate reliably the bit rate of a received signal.

According to a first aspect of the present invention there is provided a method of estimating the bit rate of a recovered data signal, comprising dividing the recovered data signal into a plurality of windows and analysing the data using known statistics on the expected data based on short integrations of the windows of the recovered data signal.

The first aspect of the present invention provides a method of detecting the presence of a data signal having one of at least two alternative bit rates, the method comprising differentially decoding the digitally modulated signals into oversampled complex signals, forming a running sum of successive groups of samples, determining if the running sum represents a signal as opposed to interference, if the running sum represents a signal, determining the sign of the running sum, assigning one of two binary values dependent on whether the sign is positive or negative, storing successive binary values in a shift register, comparing the content of the shift register with a threshold value related to one of the at least two alternative bit rates, and if the threshold value is exceeded concluding that the data signal is at said one bit rate, but if not repeating the method with the threshold value being related to the other or another of the bit rates.

According to a second aspect of the present invention there is provided a receiver comprising means for receiving and recovering a data signal, means for dividing the recovered data signal into a plurality of windows, and means for analysing the data using known statistics on the expected data based on short integrations of the windows of the recovered data signal.

The second aspect of the present invention provides a receiver comprising means for receiving a data signal, means for forming the data signal into oversampled differentially decoded complex signals, means for forming a running sum of successive groups of samples, means for determining if the running sum represents a signal as opposed to interference, and, in response to determining that the running sum represents a signal, for determining the sign of the running sum, means for assigning one of two binary values dependent on whether the sign is positive or negative, a shift register for storing successive binary values, and comparing means for comparing the content of the shift register with a threshold value related to one of the at least two alternative bit rates, the comparing means having an output for a signal representing the bit rate that has been detected.

The present invention is based on a simple algorithm using the statistics of the differentially decoded signal to detect at which bit rate data is being received. It is able to distinguish between signals whose bit rates are a multiple of say 2 from each other, for example 1200 bits/s, 2400 bits/s and 4800 bit/s and so on, from simple unsynchronised data. The bit rate estimation carried out using the method in accordance with the present invention can be done in real time on real data. The method in accordance with the present invention enables a receiver to determine significantly quicker, up to 10 times quicker compared to decoding an address and comparing it with the known address of the unit, if a received signal is unlikely to be destined for it as its data rate is different. In particular in a system comprising receiving units operating at different bit-rates, this method will provided great savings in battery life which will come from keeping switched-off the decoding unit and from the time required to detect the bit rate, the time being smaller than that needed to decode the message and extract the address from it.

Figure 2:
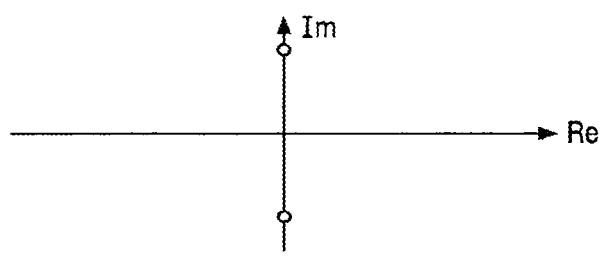
Figure 3:
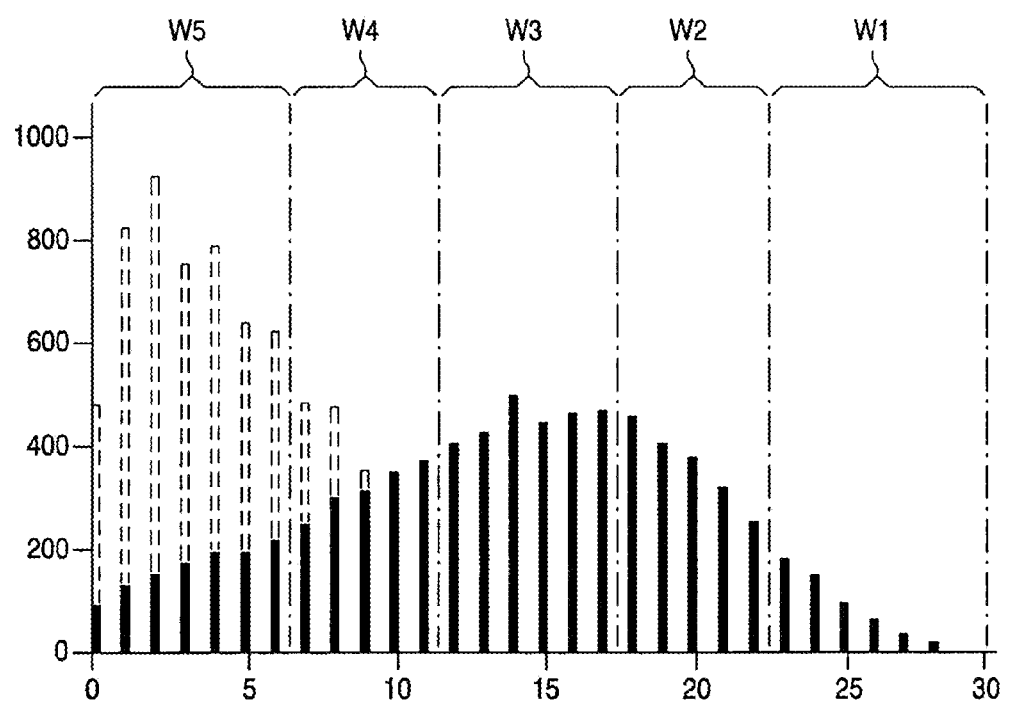
Figure 4:
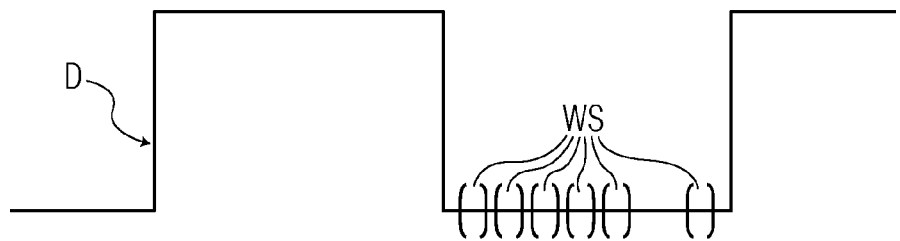
Figure 5:
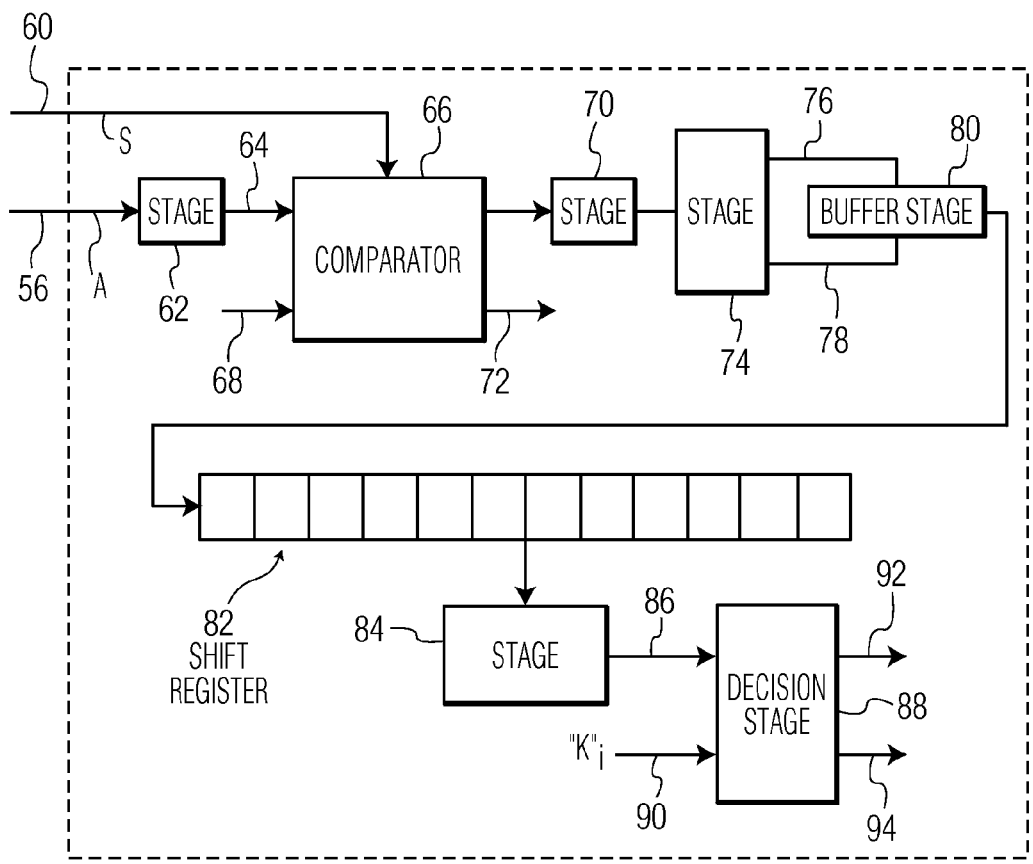

The present invention will now be described, by way of example, with reference to the accompanying drawings, wherein:

FIG. 1 is a block schematic diagram of an embodiment of a receiver made in accordance with the present invention for use with a 2-FSK signal, FIG. 2 illustrates a constellation of 2-FSK demodulated data, FIG. 3 illustrates a statistical distribution of a counter value in the presence of signal and noise together with an indication of the weights Wi assigned to each group or window; the abscissa represents the counter value and the ordinate the number of occurrences, FIG. 4 illustrates the decoded data which has been divided into a plurality of windows, and FIG. 5 is a block schematic of an embodiment of a bit rate estimator.

In the drawings the same reference numerals have been used to indicate corresponding features.

The receiver shown in FIG. 1 may be an independent receiver or the receiver section of a transceiver embodied in a telemetry module. For convenience both arrangements will be described as a receiver.

The receiver operates in accordance with a battery economising protocol whereby it is periodically woken-up from a sleep mode in which only those parts of the receiver essential to maintaining the receiver functional in its sleep state are energised.

An antenna 10 is coupled to a signal splitter 12 which supplies an input signal to first inputs 14, 15 of mixers 16, 17. A local oscillator 18 is coupled to a second input 20 of the mixer 16 and, by way of a quadrature phase shifter 22, to a second input 21 of the mixer 17. The frequency of the local oscillator 18 is selected to translate the signal received at the antenna 10 down to either a zero IF or low IF. The output from the mixer 16 is designated the in-phase signal I(t) and the output from the mixer 17 is designated the quadrature phase signal Q(t).

The in-phase and quadrature phase signals I(t) and Q(t) are respectively filtered and digitised in low pass filters 24, 25 and analogue to digital converters (ADC) 26, 27.

The ADCs 26, 27 oversample the signals I(t) and Q(t) and the samples are applied to a differential decoder 28. For example if the data rate is 150 bits/s and the sampling frequency is 76.8 kHz, the oversampling rate is 512 samples per bit, if the data rate is 1200 bits/s the oversampling rate is 64 samples per bit for the sampling frequency and 16 samples per bit for a data rate of 4800 bits/s. The differential decoder 28 is of a known design and comprises a complex signal combiner 30 having a first output coupled by way of a delay stage 31 and a complex conjugate stage 32 to a first input of a multiplier 34 and a second output coupled directly to a second input of the multiplier 34. An output of the multiplier 34 is applied to a complex real and imaginary stage 36 which supplies a real output Re and an imaginary output Im both at the oversampled bit rate.

Referring to FIG. 2 for a moment, in order to determine the bit rate it is necessary to be able to distinguish signal from noise. In the case of 2-FSK modulated transmissions, the information available on the constellation expected for the demodulated digital signal is used. As shown in FIG. 2 the constellation of the decoded signals lies entirely on the imaginary branch Im. Therefore integrating the data registered on the real channel Re, which is similar to pure noise, is not beneficial insofar as 2-FSK is concerned. By neglecting the contribution from the real channel, the speed of the detection process is increased with respect to known methods. For multilevel modulation schemes it will be necessary to include the contribution from both the real (Re) and imaginary (Im) outputs.

Referring back to FIG. 1, the oversampled imaginary output Im is supplied to a running sum counter 38, the output of which is coupled to a normally open switch 40. A counter 42 counts 32 samples and on the 32nd count it produces an output which is supplied firstly to a control input 44 of the switch 40 causing it to close transferring the running sum count to an output 41 and secondly to a reset input 46 of the counter 38 to reset the count to zero.

In a simplified embodiment a signal A on the output 41 is supplied directly to an input of the bit rate detector circuit 58. An embodiment of the bit rate circuit 58 is shown in FIG. 5, to be described later.

In a less simplified embodiment which endeavours to ensure that a signal being processed is a real signal and not simple localised noise, the signal is weighted. In order to weight the signal, the sampled running sum A on the switched output 41, is applied to an absolute value stage 48 which produces an absolute value count Xi. The absolute value count Xi from the stage 48 is supplied to a comparator 50. Four threshold values tr1 to tr4 are supplied to respective inputs of the comparator 50 which has five outputs respectively for the conditions:

Xi>tr1; tr2<Xi<tr1; tr3<Xi<tr2; tr4<Xi<tr3 and Xi<tr4. A weighting value selecting stage 54 has inputs coupled to each of the five outputs of the comparator 50 and selects a weighting value Wi in response to which one of the five outputs is active and supplies it to a multiplying stage 52. The signal A is also supplied to the stage 52.

The product S=A*Wi is supplied to another input 60 of the bit rate circuit 58.

Referring to FIG. 3, the drawing shows histograms of values of the running sum counts from the counter 38 after the counting of 32 samples. The counts will vary between 0 and 32. The distribution of noise counts, that is, counts in the presence of noise only on the air, is shown by the short broken lines and the solid black lines show the distribution of the signal counts.

By knowing in advance that the expected value of the counter 38 in the case of a signal will be very different (and generally higher) from the expected count in the case of noise. This information is used to advantage in weighting the results of different measurements according to the degree of confidence assigned to them.

FIG. 4 illustrates an example of a general case in which the data D is oversampled in a way that the typical data period will be n samples long and this data period is divided into groups or windows WS of m consecutive samples, with m<n. In the present example in which the bit rate is 150 bits/s and the oversampling frequency is 76.8 kHz, n=512 samples per bit and m=32 samples. In the embodiment shown in FIG. 1, each window of m samples is considered independently from the preceding and succeeding windows, which allows a short history contribution. The value of the counter for each group of m samples will be between 0 and m. This number is weighted according to the distribution of the data in the histogram shown in FIG. 3. In FIG. 3 getting a value of correlation bigger than 15 out of 32 will give a high probability that this is due to signal and not noise. Therefore this information can be weighted higher than information coming from a counter value of 10. Thus the values of tr1 to tr4 in FIG. 1 define various break points in the counter values and the weighting values W1 to W5 (FIG. 3) are assigned to the various bands in dependence on the confidence chosen.

Other methods of weighting can be employed besides the method just described. As a general rule the weighting Wi=f (correlation values) where the function can be any suitable linear or non-linear function appropriately designed according to the knowledge of distribution of the counter values in predefined conditions such as noise only or different signal power levels.

Referring to FIG. 5, the bit rate circuit 58 can accept alternatively the signal A on the input 56 and the weighted signal S on the input 60.

Considering the simpler method first, the signal A comprises 6 bits and in a stage 62 the most significant bit (msb) is selected and applied to one input 64 of a comparator 66. A threshold value is applied to a second input 68. If the msb is greater than the threshold value it is treated as a signal, as opposed to noise, and an output is supplied to a stage 70 which makes a decision that the sample is acceptable. Alternatively if the msb is less than the threshold value, the sample is discharged on an output 72.

In a stage 74 it is determined whether or not the signal A is positive. If it is positive, the stage 74 generates an output on a line 76 indicating that a value "1" should be entered into a shift register 82 by way of a buffer stage 80. If the signal A is not positive, that is, it is negative, then the stage generates an output on a line 78 that a value "0" should be entered into the shift register 82. The shift register 82 is I bits long, where I is typically 16.

The operation will be repeated for all the windows producing at the most n/m binary values for the shift register 82. At the end of the process, a stage 84 counts the number of ones or zeroes with a view to determining if they are in recognisable patterns. The result of the count is applied to one input 86 of a decision stage 88. A fixed threshold value k is applied to a second input 90. The value of k is set for the bit-rate under investigation. If the count on the input 86 is equal to or greater than the current value of $k_i$, an output is provided on a line 92 indicating the detected bit rate. In the event that the count is less than $k_i$, an output is provided on a line 94. Then a new search is initiated with $k_i$ being adjusted, that is decreased, to correspond to the next higher bit rate.

In the case of the weighted signal S being supplied to the bit rate circuit 58, it is applied to the comparator 66 in which it is compared with the threshold value applied to the input 68. If the sample is accepted then in the stage 74, a decision is made as to whether or not S is positive. Thereafter the bit-rate estimation follows the process already described.

In implementing the bit rate detection it is necessary to start the search from the longest period in time (i.e. the slower bit-rate) and pass to the next slower rate if the criteria for detecting the previous are not met. Therefore, the search will always be as long at least as the one necessary for the slowest rate.

For example, in a system with 150 bit/s, 1200 bit/s and 4800 bit/s, it means that detecting 4800 bit/s will anyway require 2 data periods at 150 bits/s (1024 samples). Therefore no response will be possible before 1024 samples (corresponding to 64 data periods at 4800 bit/s) i.e. at least 13.3 ms are necessary in any case. In systems with a significant difference in the rates, such as in the example, a different strategy could be more efficient.

If the start of the search process is not synchronised with the start of the data bit, the two will not be coincident and in the worst case they will be half a bit apart each other.

In this worst case the adjacent n/2 samples (256 in the case of 150 bit/s) on the left side and the adjacent n/2 on the right side are considered by examining all possible combinations of n consecutive samples from −n/2 to end+n/2, and passing just the maximum of the obtained values to the decision stage 88.

In order to acquire these data, it is necessary to shift the register the required number of bits (half its length) allowing one new sample to come in at each shift.

This will make the system work also in presence of the worst case scenario of half-bit delayed start of estimation but requires each of the bit-rates to be distinguished by at least a factor of two.

Of course, if synchronisation is given by any other means or algorithm then the system can avoid the last computation and distinguish also smaller differences in the bit-rate.

Although the embodiment of the present invention has been described with reference to 2-FSK modulation, the teachings of the present invention can be applied to higher levels of modulation in which case both the real output Re and the imaginary output Im have to be used.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of receivers having a bit rate detector stage and component parts therefore and which may be used instead of or in addition to features already described herein.

The invention claimed is:

1. A method of estimating the bit rate of a recovered data signal, comprising dividing the recovered data signal into a plurality of windows and analysing the data using known statistics on the expected data based on short integrations of the windows of the recovered data signal, taking into account within each short integration whether a preponderance of signal transitions within a corresponding window is positive or negative.

2. A receiver comprising means for receiving and recovering a data signal, means for dividing the recovered data signal into a plurality of windows, and means for analysing the data using known statistics on the expected data based on short integrations of the windows of the recovered data signal, taking into account within each short integration whether a preponderance of signal transitions within a corresponding window is positive or negative.

* * * * *